(12) United States Patent
Lee et al.

(10) Patent No.: US 11,313,424 B2
(45) Date of Patent: Apr. 26, 2022

(54) BRAKING DEVICE FOR DRIVING SHAFT

(71) Applicant: RAINBOW ROBOTICS, Daejeon (KR)

(72) Inventors: Jung Ho Lee, Daejeon (KR); Jung Woo Heo, Daejeon (KR); Jeong Soo Lim, Daejeon (KR)

(73) Assignee: RAINBOW ROBOTICS, Daejeon (KR)

( * ) Notice: Subject to any disclaimer, the term of this patent is extended or adjusted under 35 U.S.C. 154(b) by 0 days.

(21) Appl. No.: 17/040,432

(22) PCT Filed: Apr. 14, 2020

(86) PCT No.: PCT/KR2020/005012
§ 371 (c)(1),
(2) Date: Sep. 22, 2020

(87) PCT Pub. No.: WO2020/213914
PCT Pub. Date: Oct. 22, 2020

(65) Prior Publication Data
US 2021/0156437 A1    May 27, 2021

(30) Foreign Application Priority Data
Apr. 15, 2019  (KR) .......................... 10-2019-0043640

(51) Int. Cl.
*B25J 19/00*     (2006.01)
*F16D 63/00*    (2006.01)
(Continued)

(52) U.S. Cl.
CPC .............. *F16D 63/006* (2013.01); *B25J 9/10* (2013.01); *F16D 65/16* (2013.01); *F16D 2121/20* (2013.01); *F16D 2121/22* (2013.01)

(58) Field of Classification Search
CPC .... F16D 63/006; F16D 65/16; F16D 2121/20; F16D 2121/22; B25J 9/10; B25J 19/004
See application file for complete search history.

(56) References Cited

U.S. PATENT DOCUMENTS

| | | | |
|---|---|---|---|
| 9,657,791 B2 | 5/2017 | Corsetti et al. | |
| 2016/0121492 A1* | 5/2016 | Tsai | B25J 19/0004 74/490.03 |

(Continued)

FOREIGN PATENT DOCUMENTS

| | | | |
|---|---|---|---|
| CN | 108789486 A | * | 11/2018 |
| DE | 19901688 A1 | | 7/2000 |

(Continued)

*Primary Examiner* — Melanie Torres Williams
(74) *Attorney, Agent, or Firm* — Novick, Kim & Lee, PLLC; Sang Ho Lee; Hyun Woo Shin

(57) ABSTRACT

Provided is a braking device for a driving shaft, and the braking device includes: a brake ring coupled to the driving shaft in such a manner as to rotate according to rotation of the driving shaft and having one or more locking pieces with cross-shaped ends; a support frame fixed to an interior of a robot articulation; brake wings rotatable around brake shafts formed on the support frame and having locking protrusions adapted to stop the rotation of the driving shaft through physical interference with the cross-shaped ends of the locking pieces of the brake ring; position regulators adapted to rotate the brake wings to allow positions of the locking protrusions to be moved; and elastic members adapted to apply elastic forces to the brake wings rotating.

8 Claims, 5 Drawing Sheets

(51) Int. Cl.
  *B25J 9/10* (2006.01)
  *F16D 65/16* (2006.01)
  *F16D 121/20* (2012.01)
  *F16D 121/22* (2012.01)

(56) References Cited

U.S. PATENT DOCUMENTS

2016/0201740 A1   7/2016  Kimes et al.
2019/0030735 A1*  1/2019  Chiu ................... B25J 19/0004
2019/0301548 A1* 10/2019  Shao ................... H02K 7/1021

FOREIGN PATENT DOCUMENTS

| | | |
|---|---|---|
| JP | 2014-093790 A | 5/2014 |
| JP | 2017-064802 A | 4/2017 |
| KR | 10-2013-0018599 A | 2/2013 |
| KR | 10-2015-0111253 A | 10/2015 |
| KR | 10-2018-0060264 A | 6/2018 |
| KR | 10-1915394 B1 | 11/2018 |
| KR | 101915394 B1 * | 11/2018 |
| WO | 2012/086314 A1 | 6/2012 |
| WO | WO-2017148499 A1 * | 9/2017 .......... B25J 19/0004 |

\* cited by examiner

BRAKING DEVICE FOR DRIVING SHAFT

TECHNICAL FIELD

The present invention relates to a braking device for a driving shaft, which is used for a robot articulation and the like.

BACKGROUND ART

With the development of robot technologies, recently, needs for intelligent robots capable of performing various work as well as for robots for industrial uses, instead of human beings, have increasingly emerged, and accordingly, many studies on the intelligent robots are made.

So as to develop the intelligent robots, advanced technologies like advanced materials, semiconductors, artificial intelligence, sensor software, and so on as well as traditional technologies like machines, electronics and so on are required, and unlike existing robots for industrial uses, the intelligent robots have the functions and performance necessary in future markets.

On the other hand, the robots for industrial and service uses have been developed and used in various fields, and they perform high-skilled work as well as simple work accurately and quickly, so that they has been increasingly used.

An articulation module of the robot used for various industries and service fields includes a motor, a torque sensor for stably driving the motor, and a braking device, and among them, the braking device is necessarily used to control acceleration and deceleration of an object moving or to maintain a position of a robot arm when the robot arm stops working.

A conventional braking device performs a braking operation for an object through a frictional type brake pad, and in detail, the brake pad mechanically comes into contact with the object to be braked, so that through a frictional force generated from the contact therebetween, the braking operation for the object can be performed.

In case of the conventional frictional type braking device, however, slip occurs during the braking operation, and accordingly, the conventional braking device cannot be used for a part where a stopping force is regulated in a relatively accurate manner, for example, for a robot articulation.

Prior art document 1. Korean Patent Application Laid-open No. 10-2013-0018599 (Dated Feb. 25, 2013)

DISCLOSURE

Technical Problem

Accordingly, the present invention has been made in view of the above-mentioned problems occurring in the related art, and it is an object of the present invention to provide a braking device for a driving shaft that is capable of being appropriately used for a robot articulation and being also configured to have improved braking performance.

Technical Solution

To accomplish the above-mentioned objects, according to the present invention, there is provided a braking device for a driving shaft used for a robot articulation, which is used for a robot articulation, the braking device including: a brake ring coupled to the driving shaft in such a manner as to rotate according to rotation of the driving shaft and having one or more locking pieces with cross-shaped ends; a support frame fixed to an interior of the robot articulation; brake wings rotatable around brake shafts formed on the support frame and having locking protrusions adapted to stop the rotation of the driving shaft through physical interference with the cross-shaped ends of the locking pieces of the brake ring; position regulators adapted to rotate the brake wings to allow positions of the locking protrusions to be moved; and elastic members adapted to apply elastic forces to the brake wings rotating.

According to the present invention, desirably, the locking pieces of the brake ring protrude radially from a body coupled to the driving shaft, and through rotation of the brake wings, the locking protrusions are moved between a first position located inside a rotation radius of the cross-shaped ends of the locking pieces of the brake ring and a second position located outside the rotation radius of the cross-shaped ends of the locking pieces of the brake ring.

If the locking protrusions are moved to the first position, they physically interfere with the cross-shaped ends of the locking pieces of the brake ring to allow the driving shaft to stop rotating.

According to the present invention, desirably, the position regulators have solenoids adapted to rotate the brake wings according to existence or non-existence of input current or direction of the input current to allow the locking protrusions to be moved to any one of the first and second positions.

Advantageous Effects

According to the present invention, the braking device is provided with the brake ring coupled to the driving shaft of the robot articulation and having one or more locking pieces with the cross-shaped ends and the brake wings rotating around the brake shafts of the support frame fixed to the robot articulation and having the locking protrusions protruding therefrom, so that the driving shaft stops rotating through physical interference of the locking protrusions with the cross-shaped ends of the locking pieces, thereby making it possible to perform bi-directional braking even with small gaps.

MODE FOR INVENTION

Figure 1:
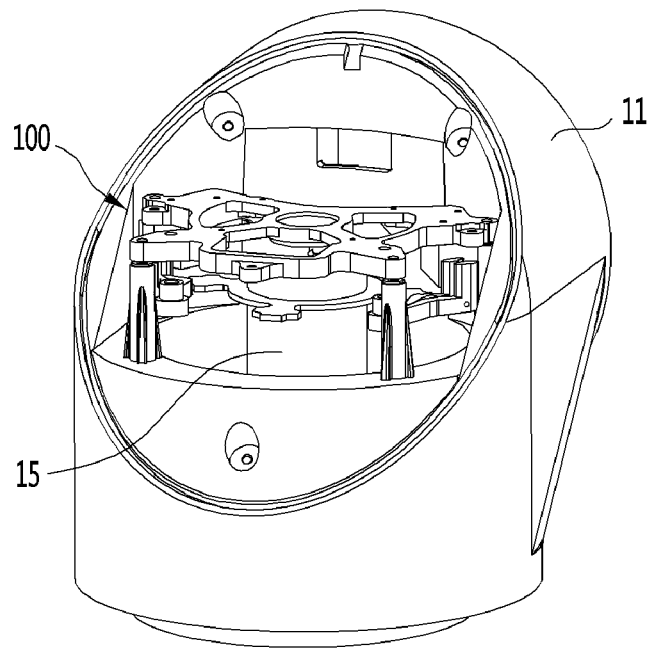
FIG. 1 is a perspective view showing a robot articulation on which a braking device for a driving shaft according to the present invention is located.

While this invention is illustrated and described in a preferred embodiment, the device may be produced in many different configurations, forms, and materials. There is depicted in the drawings, and will hereinafter be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

It should be understood that detailed explanations on the principle, view and embodiment of the present invention may include structural and functional equivalents thereof. Further, it should be appreciated that such equivalents may include currently known equivalents as well as equivalents to be developed in the future, that is, all of devices that are invented to perform the same functions, irrespective of structures thereof.

For example, it should be understood that a block diagram in the present invention shows a conceptual view of an exemplary circuit explaining the principle of the present invention. Similarly, all flowcharts, state transition diagrams, and pseudo codes substantially appear on a computer readable medium, and they indicate various processes performed by a computer or processor, irrespective of whether the computer or processor is obviously shown.

Functions of various elements indicated on drawings including functional blocks indicated as a processor or a similar concept thereto are provided by the use of dedicated hardware as well as hardware having capability of implementing appropriate software. If the functions are provided by the processor, they are supplied by a single dedicated processor, a single shared processor, or a plurality of individual processors, and some of them can be shared.

Objects, characteristics and advantages of the present invention will be more clearly understood from the detailed description as will be described below and the attached drawings, and it is to be appreciated that those skilled in the art can change or modify the embodiments without departing from the scope and spirit of the present invention. If it is determined that the detailed explanation on the well known technology related to the present invention makes the scope of the present invention not clear, the explanation will be avoided for the brevity of the description.

Hereinafter, the present invention will be in detail explained with reference to the attached drawings.

FIG. 1 is a perspective view showing a robot articulation on which a braking device for a driving shaft according to the present invention is located.

As shown in FIG. 1, a braking device 100 according to the present invention is coupled to a driving shaft 15 of a motor at the inside of an articulation 10 of a robot, together with a decelerator and an encoder, so that when the motor stops, the braking device 100 stops the rotation of the articulation 10 at an accurate position.

For example, the articulation 10 is provided for various robots such as collaborative robots, robots for industrial uses, humanoid robots, robot manipulators, and so on, but according to the present invention, the articulation 10 is not limited thereto. In addition to the robots, further, the braking device 100 can be used as a brake mechanism coupled to driving shafts of a variety of devices.

As shown in FIG. 1, the articulation 10 of the robot is provided with the driving shaft 15 and the braking device 100 coupled to the driving shaft 15 at the interior of a housing 11.

According to the present invention, the braking device 100 includes a brake ring coupled to the driving shaft 15 of the articulation 10 of the robot and having one or more locking pieces with cross-shaped ends, brake wings rotating around brake shafts of a support frame fixed to the articulation 10 of the robot and having locking protrusions adapted to stop rotation of the driving shaft 15 through physical interference with the cross-shaped ends of the locking pieces, so that it is possible to perform bi-directional braking even with small gaps.

Hereinafter, an explanation on the configuration and operations of the braking device 100 for the driving shaft according to the present invention will be in detail given with reference to FIGS. 2 to 6.

Figure 2:
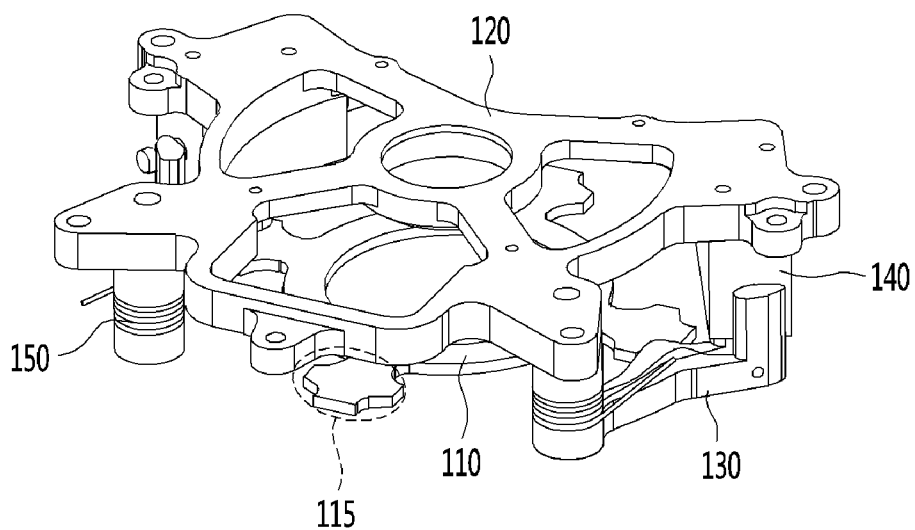
FIGS. 2 and 3 are perspective and top views showing the braking device for the driving shaft according to the present invention.
Figure 3:
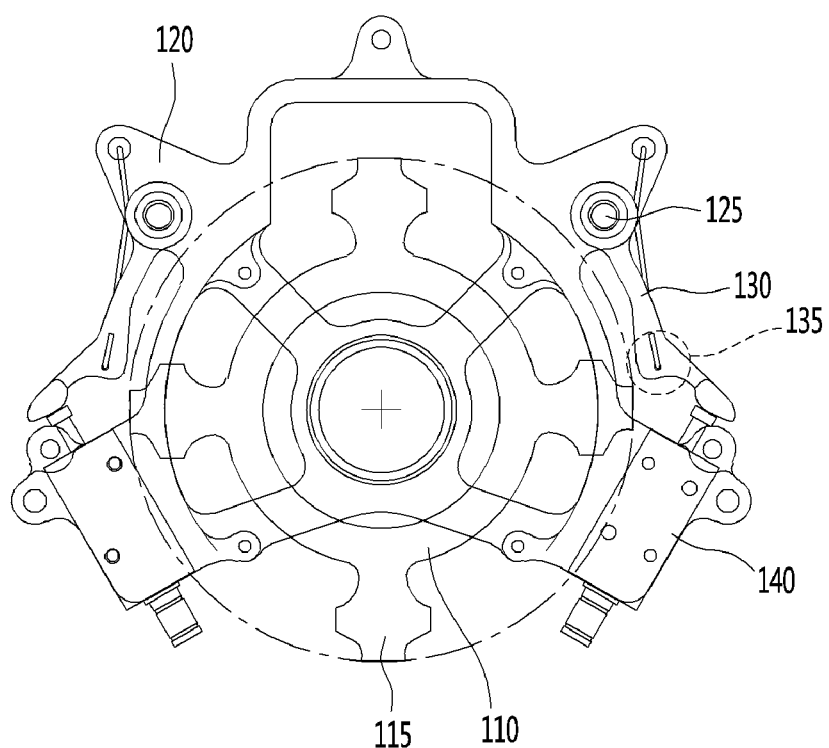

FIGS. 2 and 3 are perspective and top views showing the braking device for the driving shaft according to the present invention, and the braking device 100 includes a brake ring 110, a support frame 120, brake wings 130, position regulators 140, and elastic members 150.

Referring to FIGS. 2 and 3, first, the brake ring 110 is coupled to the driving shaft 15 in such a manner as to rotate according to the rotation of the driving shaft 15 and has one or more locking pieces 115 with cross-shaped ends.

For example, as shown in FIG. 3, the brake ring 100 has the four locking pieces 115 protruding radially from a body coupled to the driving shaft 15, and the ends of the locking pieces 115 have similar shapes to a cross.

The support frame 120 is fixed to the inner periphery of the articulation 10 of the robot, and for example, as shown in FIG. 1, the support frame 120 is fixedly coupled to the housing 11 of the articulation 10 by means of separate connection members and fastening members.

Further, the brake wings 130 are rotatable around brake shafts 125 located on the support frame 120 and have locking protrusions 135 adapted to stop rotation of the driving shaft 15 through physical interference with the cross-shaped ends of the locking pieces 115.

The position regulators 140 are adapted to rotate the brake wings 130, and through the rotation of the brake wings 130, the locking protrusions 135 are moved to regulate the physical interferences of the brake wings 130 with the cross-shaped ends of the locking pieces 115 of the brake ring 110.

As the brake wings 130 rotate by means of the position regulators 140, further, the locking protrusions 135 are moved between a first position located inside a rotation radius of the cross-shaped ends of the locking pieces 115 of the brake ring 110 and a second position located outside the rotation radius of the cross-shaped ends of the locking pieces 115 of the brake ring 110.

If the locking protrusions 135 are moved to the first position, they physically interfere with the cross-shaped ends of the locking pieces 115 of the brake ring 110 to allow the driving shaft 15 to stop rotating, and if the locking protrusions 135 are moved to the second position, they do not physically interfere with the cross-shaped ends of the locking pieces 115 of the brake ring 110, so that the rotation of the driving shaft 15 is not influenced at all.

In this case, the position regulators 140 include solenoids adapted to rotate the brake wings 130 according to existence or non-existence of input current or direction of the input current to allow the locking protrusions 135 to be moved to any one of the first and second positions.

In this case, the braking device 100 according to the present invention further includes a controller (not shown) for controlling the input current applied to the solenoids.

Moreover, the elastic members 150 serve to apply elastic forces to the brake wings 130 rotating.

For example, as shown in FIG. 2, each elastic member 150 is formed of a spring whose one end is fixed to the corresponding brake wing 130 and the other end is fixed to the support frame 120.

Figure 4:
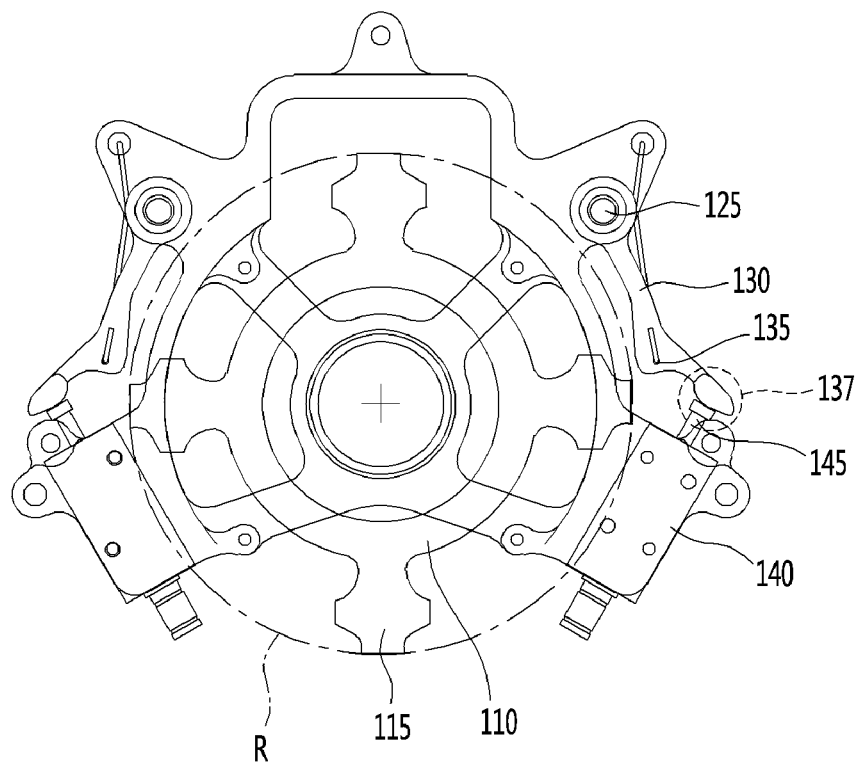
FIGS. 4 and 5 are top views showing operations of the braking device for the driving shaft according to the present invention.
Figure 5:
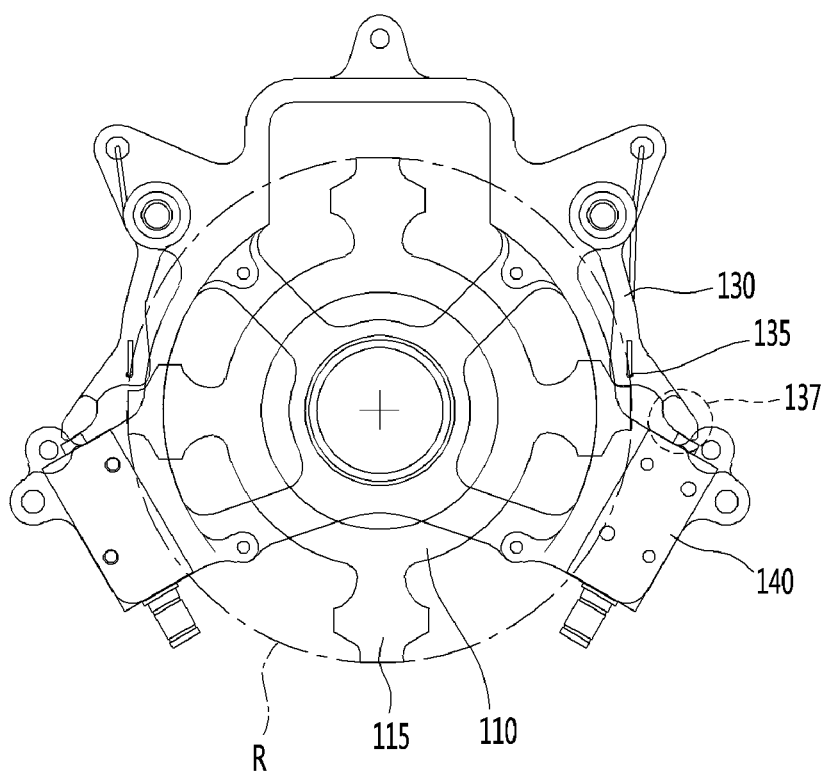

FIGS. 4 and 5 are top views showing operations of the braking device for the driving shaft according to the present invention, and explanations on the same operations of the braking device 100 according to the present invention as shown in FIGS. 1 to 3 will be avoided below.

Referring to FIGS. 4 and 5, each brake wing 130 has one side connected to the brake shaft 125 of the support frame 120 and a contact portion 137 formed on the other side thereof in such a manner as to come into contact with a moving member 145 moving by means of the solenoid, and further, each brake wing 130 has the locking protrusion 135 formed between one side and the other side thereof.

FIG. 4 shows a state where the cross-shaped ends of the locking pieces 115 of the brake ring 110 do not physically interfere with the locking protrusions 135 of the brake wings 130.

If the solenoids located on the position regulators 140 are turned on, as shown in FIG. 4, the moving members 145 are moved to the brake wings 130 and thus push the contact portions 137 of the brake wings 130 coming into contact therewith, thereby rotating the brake wings 130.

If the brake wings 130 rotate, like this, the locking protrusions 135 are moved to the outside of the rotation radius R of the cross-shaped ends of the locking pieces 115 of the brake ring 110, and accordingly, the brake wings 130 do not interfere with the rotation of the brake ring 110, so that the driving shaft 15 can rotate freely.

FIG. 5 shows a state where the cross-shaped ends of the locking pieces 115 of the brake ring 110 physically interfere with the locking protrusions 135 of the brake wings 130.

If the solenoids located on the position regulators 140 are turned off, as shown in FIG. 5, the brake wings 130 rotate by means of the elastic forces of the elastic members 150 connected thereto and are thus returned to their original position.

If the brake wings 130 are returned to their original position through rotation, like this, the locking protrusions 135 are moved to the inside of the rotation radius R of the cross-shaped ends of the locking pieces 115 of the brake ring 110, and accordingly, the brake wings 130 interfere with the rotation of the brake ring 110, so that the driving shaft 15 can stop rotating.

On the other hand, the solenoids are built in the position regulators 140 to increase or reduce magnetic fluxes in any one direction according to the application of current.

According to the arrangements of permanent magnets and coils located in the solenoids, for example, the magnetic fluxes formed in one direction are increased or the magnetic fluxes formed in the other direction are reduced, so that the moving members 145 are moved to rotate the brake wings 130.

If latch type solenoids are located on the position regulators 140, on the other hand, variations of the magnetic fluxes can be maintained by means of application of current only one time when the motor is driven or braked, thereby needing no continuous application of current.

As mentioned above, if the solenoids located on the position regulators 140 are turned on, the physical interference of the brake ring 110 with the brake wings 130 is released, and if the solenoids are turned off, the physical interference of the brake ring 110 with the brake wings 130 occurs to stop the rotation of the driving shaft 15. However, the present invention is not limited to the above-mentioned disclosure, and accordingly, the brake wings 130 may rotate through various ways to regulate the physical interference with the brake ring 110.

If the driving shaft 15 stops rotating by means of the physical interferences between the cross-shaped ends of the locking pieces 115 of the brake ring 110 and the locking protrusions 135 of the brake wings 130, as shown in FIG. 5, the driving shaft 15 can be maintained to a state where bi-directional rotation stops.

Figure 6:
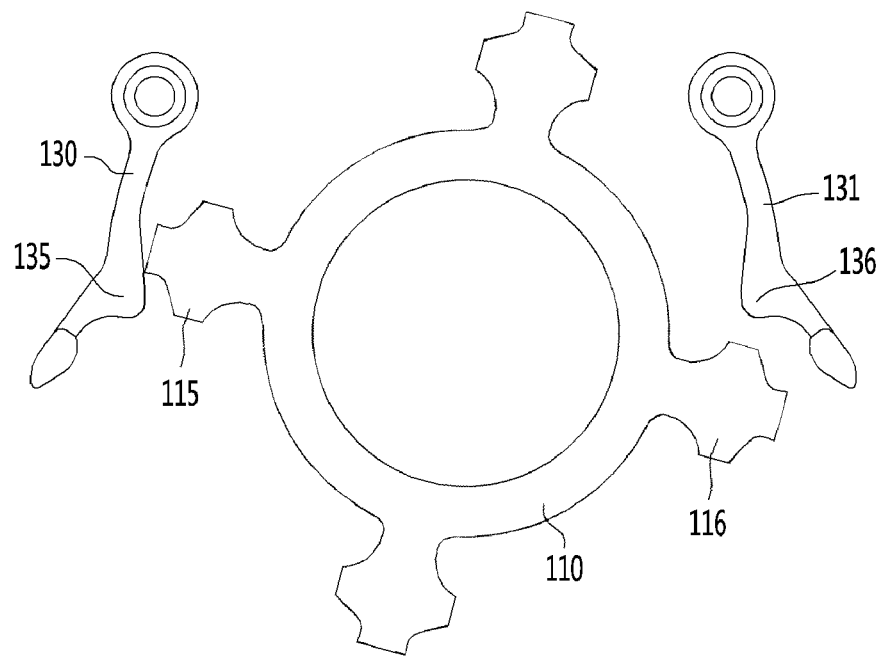
FIG. 6 is a top view showing a brake ring and brake wings of the braking device for the driving shaft according to the present invention.

Referring to FIG. 6, the four cross-shaped locking pieces 115 are formed on the brake ring 110, and accordingly, braking can be performed within a maximum of 45°, irrespective of the location of the driving shaft 15 rotating and the rotating direction thereof.

While the driving shaft 15 is rotating in a clockwise direction, for example, the solenoid is turned off at the moment when the brake wings 130 are located between the cross-shaped locking pieces 115, and after that, if the brake wings 130 enter the rotation radius, the left brake wing 130 is pushed by the locking piece 115 and thus rotates at a maximum of 45° until the right brake wing 130 is locked onto the locking piece 115, so that braking can be performed.

If a convex portion of the locking protrusion 135 formed on the brake wing 130 lockedly comes into contact with a concave portion of the cross-shaped end of the locking piece 115, the brake ring 110 can be prevented from rotating in clockwise and counterclockwise directions.

To do this, the sizes, shapes, and angles of the locking protrusions 135 of the brake wings 130 and those of the end portions of the cross-shaped locking pieces 115 are desirably set correspondingly to one another, as shown in FIG. 6.

For example, an angle formed by the contact between the concave portion of the end portion of the cross-shaped locking piece 115 and a portion of the brake wing 130 contacted therewith is smaller than 90° with respect to a tangential direction at the outermost point of a contacted portion therebetween, and even if the driving shaft 15 rotates, accordingly, the brake wing 130 is not pushed outward by means of the rotary force of the driving shaft 15 when it comes into contact with the locking piece 115. Also, the brake wing 130 further receives the force applied to the locking piece 115 so that it cannot be unlocked from the locking piece 115.

Figure 7:
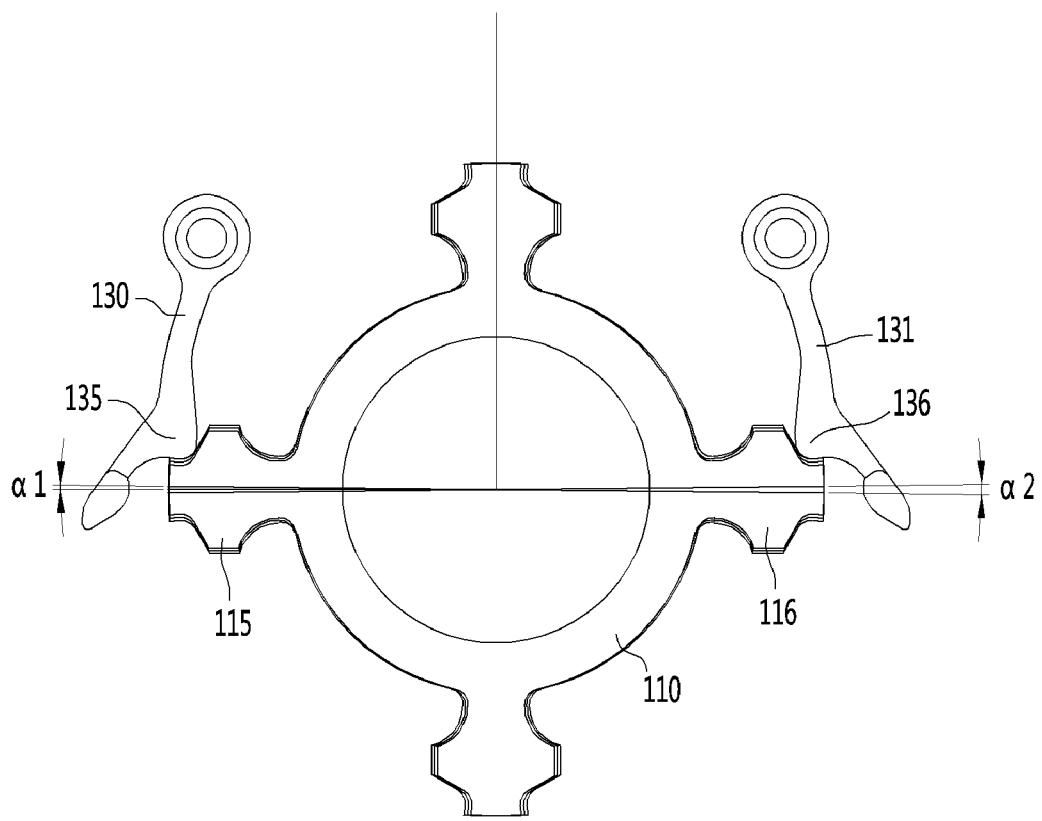
FIG. 7 is a top view showing gaps of the braking device for the driving shaft according to the present invention.

On the other hand, as shown in FIG. 7, the braking device 100 has two brake wings 130 and 131 corresponding to two locking pieces 115 and 116 formed on the brake ring 110, and two locking protrusions 135 and 136, which are formed on the two brake wings 130 and 131, are moved to the first position within the rotation radius of the locking pieces 115 and 116 to allow the driving shaft 15 coupled to the brake ring 110 to stop rotating.

In this case, the braking device for the driving shaft according to the present invention may have bi-directional braking gaps corresponding to the positions of the locking protrusions 135 and 136.

In detail, mounting positions of the brake wings 130 and 131 are somewhat higher than positions where the locking protrusions 135 and 136 come into contact with the locking pieces 115 and 116 in a state where the locking pieces 115 and 116 of the brake ring 110 are arranged in 9 and 3-o'clock directions.

Accordingly, the brake ring 110 has a gap rotatable by a given angle α1 in a clockwise direction and a gap rotatable by a given angle α1 even in a counterclockwise direction, so that the brake ring 110 may have a bi-directional gap by an angle α2 two times larger than the given angle α1.

For example, the brake ring 110 has a gap rotatable by about 0.6° in the clockwise and counterclockwise directions, so that it may have the bi-directional gap of about 1.2°, and to do this, the positions of the brake wings 130 and 131 or the locking protrusions 135 and 136 may be determined to correspond to the above-mentioned gaps.

On the other hand, as shown in FIG. 5, one end of the torsion spring as the elastic member 150 passes through an insertion hole formed on the locking protrusion of the brake wing 130 in such a manner as to be bent and fixed to the corresponding brake wing 130.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

EXPLANATIONS ON REFERENCE NUMERALS IN THE DRAWING

| | |
|---|---|
| 10: robot articulation | 11: housing |
| 15: driving shaft | 100: braking device |
| 110: brake ring | 115: locking piece |
| 120: support frame | 125: brake shaft |
| 130: brake wing | 135: locking protrusion |
| 137: contact portion | 140: position regulator |
| 145: moving member | 150: elastic member |

The invention claimed is:

1. A braking device for a driving shaft, which is used for a robot articulation, the braking device comprising:
   a brake ring coupled to the driving shaft in such a manner as to rotate according to rotation of the driving shaft and having one or more locking pieces with cross-shaped ends;
   a support frame fixed to an interior of the robot articulation;
   brake wings rotatable around brake shafts formed on the support frame and having locking protrusions adapted to stop the rotation of the driving shaft through physical interference with the cross-shaped ends of the locking pieces of the brake ring;
   position regulators adapted to rotate the brake wings to allow positions of the locking protrusions to be moved; and
   elastic members adapted to apply elastic forces to the brake wings rotating.

2. The braking device for a driving shaft according to claim 1, wherein the locking pieces of the brake ring protrude radially from a body coupled to the driving shaft.

3. The braking device for a driving shaft according to claim 1, wherein through rotation of the brake wings, the locking protrusions are moved between a first position located inside a rotation radius of the cross-shaped ends of the locking pieces of the brake ring and a second position located outside the rotation radius of the cross-shaped ends of the locking pieces of the brake ring, so that if the locking protrusions are moved to the first position, the locking protrusions physically interfere with the cross-shaped ends of the locking pieces of the brake ring to allow the driving shaft to stop rotating.

4. The braking device for a driving shaft according to claim 3, wherein two brake wings are provided correspondingly to two locking pieces formed on the brake ring, and two locking protrusions formed on the two brake wings are moved to the first position to provide a bi-directional gap corresponding to the positions of the two locking protrusions.

5. The braking device for a driving shaft according to claim 3, wherein the position regulators have solenoids adapted to rotate the brake wings according to existence or non-existence of input current or direction of the input current to allow the locking protrusions to be moved to any one of the first and second positions.

6. The braking device for a driving shaft according to claim 5, wherein each brake wing has one side connected to the corresponding brake shaft of the support frame and the other side coming into contact with a moving member moving by means of the solenoid, each brake wing having the locking protrusion formed between one side and the other side thereof.

7. The braking device for a driving shaft according to claim 5, further comprising a controller for controlling the input current applied to the solenoids.

8. The braking device for a driving shaft according to claim 1, wherein each elastic member is formed of a spring whose one end is fixed to the corresponding brake wing and the other end is fixed to the support frame.

* * * * *